United States Patent
Khot et al.

(10) Patent No.: US 10,321,101 B2
(45) Date of Patent: Jun. 11, 2019

(54) SYSTEM AND METHOD OF SHARING OR CONNECTING SECURITY AND HOME CONTROL SYSTEM

(71) Applicant: Honeywell International Inc., Morristown, NJ (US)

(72) Inventors: Bharat Balaso Khot, Karnataka (IN); Eric Oh, Syosset, NY (US); Ajay Partap Singh Chhokar, Karnataka (IN); Karthikeyan Pollachi Duraiswamy, Karnataka (IN); Kiran Kumar Guduguntla, Karnataka (IN); Rajendra Kumar Venkata Alluri, Karnataka (IN)

(73) Assignee: ADEMCO INC., Golden Valley, MN (US)

( * ) Notice: Subject to any disclaimer, the term of this patent is extended or adjusted under 35 U.S.C. 154(b) by 227 days.

(21) Appl. No.: 14/699,199

(22) Filed: Apr. 29, 2015

(65) Prior Publication Data

US 2016/0323548 A1    Nov. 3, 2016

(51) Int. Cl.
| | |
|---|---|
| H04N 7/18 | (2006.01) |
| G08B 25/00 | (2006.01) |
| G06F 3/0484 | (2013.01) |
| H04L 12/58 | (2006.01) |
| G08B 25/14 | (2006.01) |

(52) U.S. Cl.
CPC ......... *H04N 7/183* (2013.01); *G06F 3/04842* (2013.01); *G08B 25/009* (2013.01); *H04L 51/046* (2013.01); *G08B 25/14* (2013.01)

(58) Field of Classification Search
CPC . G06F 3/04842; H04L 51/046; G08B 25/009; G08B 25/14; H04N 7/183

USPC .............. 348/148, 159, 143; 340/517, 5.33; 375/240.22; 455/414.1; 342/357.42; 345/173

See application file for complete search history.

(56) References Cited

U.S. PATENT DOCUMENTS

| | | | |
|---|---|---|---|
| 7,113,090 B1 * | 9/2006 | Saylor | G08B 13/19682 340/5.33 |
| 8,810,657 B1 * | 8/2014 | Slavin | G08B 13/19684 348/143 |
| 2005/0253706 A1 | 11/2005 | Spoltore et al. | |

(Continued)

OTHER PUBLICATIONS

Extended European search report from corresponding EP patent application 16165890.1, dated Jul. 21, 2016.

*Primary Examiner* — Jayanti K Patel
*Assistant Examiner* — Richard B Carter
(74) *Attorney, Agent, or Firm* — Husch Blackwell LLP

(57) ABSTRACT

A method and apparatus including providing a plurality of security systems, each detecting threats within a different respective secured geographic area and each reporting detected threats to a central monitoring station, a human user of a first of the plurality of security systems sending a notification to an authorized human user of a second of the plurality of security systems through the central monitoring station, the notification authorizing control of the first security system by the user of the second security system, in response to the notification, the central monitoring station forming a control connection between the first and second security systems and the user of the second security system controlling the first security system through a user interface of the second security system

20 Claims, 2 Drawing Sheets

(56) References Cited

U.S. PATENT DOCUMENTS

| | | | |
|---|---|---|---|
| 2007/0298772 A1* | 12/2007 | Owens | G08B 13/19658 |
| | | | 455/414.1 |
| 2009/0231189 A1* | 9/2009 | Reddy | G01S 19/05 |
| | | | 342/357.42 |
| 2009/0243852 A1 | 10/2009 | Haupt et al. | |
| 2012/0200711 A1* | 8/2012 | Dolin | H04N 7/181 |
| | | | 348/159 |
| 2014/0191994 A1* | 7/2014 | Chung | G06F 3/0488 |
| | | | 345/173 |
| 2014/0266681 A1* | 9/2014 | Dunn | G08B 26/00 |
| | | | 340/517 |

* cited by examiner

SYSTEM AND METHOD OF SHARING OR CONNECTING SECURITY AND HOME CONTROL SYSTEM

FIELD

This application relates to security systems and more particular to the control of security systems.

BACKGROUND

Systems are known to protect people and assets within secured areas. Such systems are typically based upon the use of one more sensors that detect threats within the secured area.

Threats to people and assets may originate from any of number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within the area. Intruders have also been known to injure or kill people living within the area.

In the case of intruders, sensors may be placed in different areas based upon the respective uses of those areas. For example, if people are present during some portions of a normal day and not at other times, then sensors may be placed along a periphery of the space to provide protection while the space is occupied while additional sensors may be placed within an interior of the space and used when the space is not occupied.

In most cases, threat detectors are connected to a local control panel. In the event of a threat detected via one of the sensors, the control panel may sound a local audible alarm. The control panel may also send a signal to a central monitoring station.

While security system work well, they are sometimes difficult to use. Accordingly, a need exists for better methods of controlling such systems.

DETAILED DESCRIPTION

Figure 1:
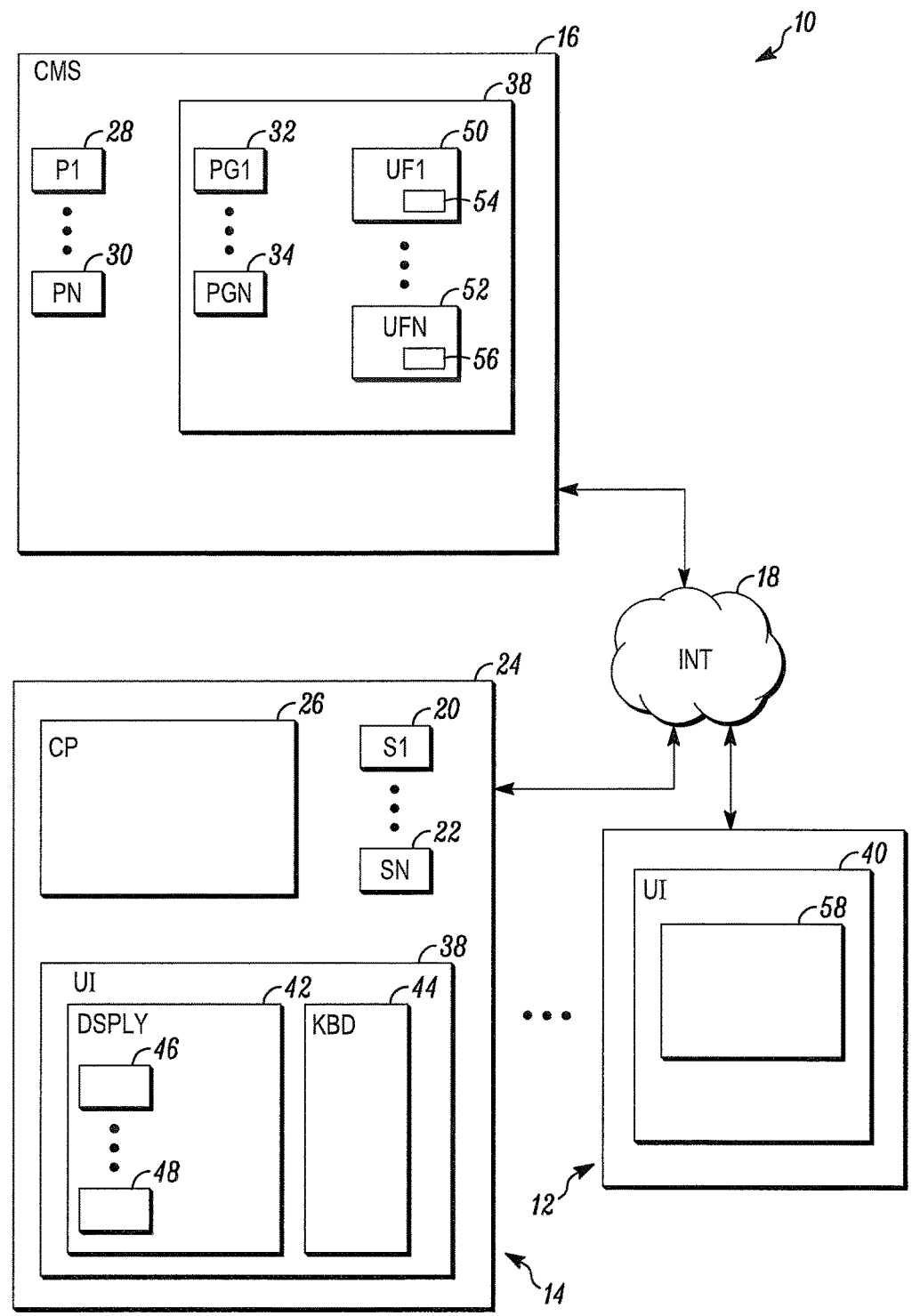
FIG. 1 illustrates a block diagram of a security system network in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a block diagram of a network 10 of security systems shown generally in accordance with an illustrated embodiment. The network may include any of a number of local security systems 12, 14 all connected to a central monitoring station 16 through the Internet 18.

Each of the individual security systems may include a number of sensors 20, 22 that detect threats within a respective secured geographic area 24. The sensors may be chosen to detect any of a number of threats. For example, some of the sensors may be limit switches placed on the doors and/or windows located on a periphery of the secured areas and that detect intruders entering the secured area. Other of the sensors may be passive infrared (PIR) detectors placed within the interior of the spaces for the detection of intruders who have been able to circumvent the sensors located along the periphery. Other of the sensors may be environmental detectors (e.g., smoke, fire, carbon monoxide, etc.).

The sensors of each of the security systems may be monitored via a respective control panel 26 located within the area (as shown in FIG. 1) or located remotely. Upon activation of one of the sensors, the control panel may send an alarm message to the central monitoring station. The central monitoring station may respond by summoning help (e.g., police, fire department, etc.).

Located within the central monitoring station, the control panel and the sensors of each of the local security systems may be one or more processor apparatus (processors) 28, 30 each operating under control of one or more computer programs 32, 34 loaded from a computer readable medium (memory) 36. As used herein, reference to a step performed by a computer program is also reference to the processor that executed that step.

Located within the secured area of each of the local security systems is a user interface 38, 40 used by an authorized human user to control the local security system. The user interface may include a display 42 that shows alarm system status and a user input device (e.g., a keyboard) 44 through which the user enters instructions for controlling the security system. Alternatively, the display and keyboard may be combined into a touchscreen. As used herein, a user interface may refer to the display and keyboard, to a touchscreen or to a window presented on the display.

Also shown on the display may be one or more icons 46, 48 used to entering instructions through the user interface. For example, one of the icons may be an arm away instruction. Another icon may be an arm stay instruction. A third may be a disarm instruction.

For example, to arm the system, the user may activate the arm away icon. To disarm the system, the user may enter a personal identification number (PIN) followed by activation of the disarm command or he/she may simply enter his/her PIN.

Once armed, an alarm processor within the local control panel of the security system may monitor each of the sensors. Upon activation of one of the sensors, the alarm processor may send the alarm message to the central monitoring station. The alarm message may include an identifier of the security system (e.g., an account number, identifier of the sensor and a time).

Under one illustrated embodiment, a human user of a first local security system may allow a human user of a second security system to control the first security system through the user interface of the second security system. This may be important where a family member (e.g., a parent) is leaving on vacation and wants a child (living separately from the parent) to be able to control the parent's security system through the child's security system.

Under the illustrated embodiment, the remote control of security systems is accomplished via a remote control processor of the central monitoring station based upon the information contained within a number of user files 50, 52. In this case, a file (e.g., file 50) of the parent may include an identifier 54 of the child and a file (e.g., file 52) of the child may include an identifier of the parent. In this case, the identifiers may include a respective identifier of the parent and child security systems as well as PINs of the authorized parent and of the authorized child.

In another embodiment, the file of the parent may include a number of identifiers of people who the parent is willing to allow to control the parent's security system. This may include other children, relatives or close neighbors. In each case, the identifier of the other person would include identifiers of corresponding security systems and persons authorized to use those security systems.

In order to transfer control of the parent security system, the parent may activate a system control transfer icon on the user interface of the parent. The parent may then be prompted to enter his/her PIN in order to ensure that the user has the proper authorization for making this change.

In this regard, a control transfer processor within the control panel of the security system of the parent may receive the instruction and compare the entered PIN with a local reference PIN previously saved in memory. If the PIN indicates an authorized user, then the parent will be prompted to select or otherwise designate a person to be placed in control of the parent's security system. Once the designated party is selected, the local control transfer processor may transfer the request to the remote control processor. The local transfer processor may also send a chat message to the person indicating that control of the patent's security system has been given to the person through the person's home security system.

Upon receipt of the request, the remote control processor may perform a similar set of validation steps before implementing transfer of control. Upon validating the request, the remote control processor may implement a control connection between the two security systems (e.g. the parent's security system and the child's security system). In this regard, the control connection may be based upon a corresponding processor within the parent and child security systems that emulate the control features and behavior of the parent user interface on the child user interface.

Under one illustrated embodiment, the parent's user interface may be presented as an additional zone in the child's user interface. Under another embodiment, the parent's user interface (remote user interface) may be accessed through the child's user interface by selecting an access control icon associated with the parent's identifier.

In either case, the remotely presented user interface of the security system of the parent may be presented within a separate parent window 58 on the user interface of the security system of the child in real time. In this regard, a monitoring processor associated with the child user interface may monitor control features or icons of the parent window for activation for the child user. Upon activation of any control feature, an indication of the feature activated is transferred back to a corresponding monitoring processor of the parent security system for execution. Similarly, real time status updates from the parent system are presented within the parent window on the child's user interface.

Under another embodiment, the parent or (or a first user of a first security system) may decide to give control of his/her security system to a child (or second user), but only on a limited basis. For example, the first user may only want to enable the arm/disarm functions and reporting of security breaches to the second user. In this example, the first user may not want to allow the second user to bypass any alarms or to disable any cameras that continuously record images from the secured space of the first user.

In this case, the first person would access the control transfer icon on the user interface of his/her security system and be presented with a list of functions that the first user wants to transfer to and be accessible by the second user through the second user interface. The first user may select the arm and disarm function and a reporting function. The first user may then select the second user and activate a control transfer button. In response, the remote control processor may establish the link between the first and second security system and send a chat message to the second user including a list of functions granted to the second user. Chat messages are also used to notify the second person of security events occurring within the secured area of the first person.

Figure 2:
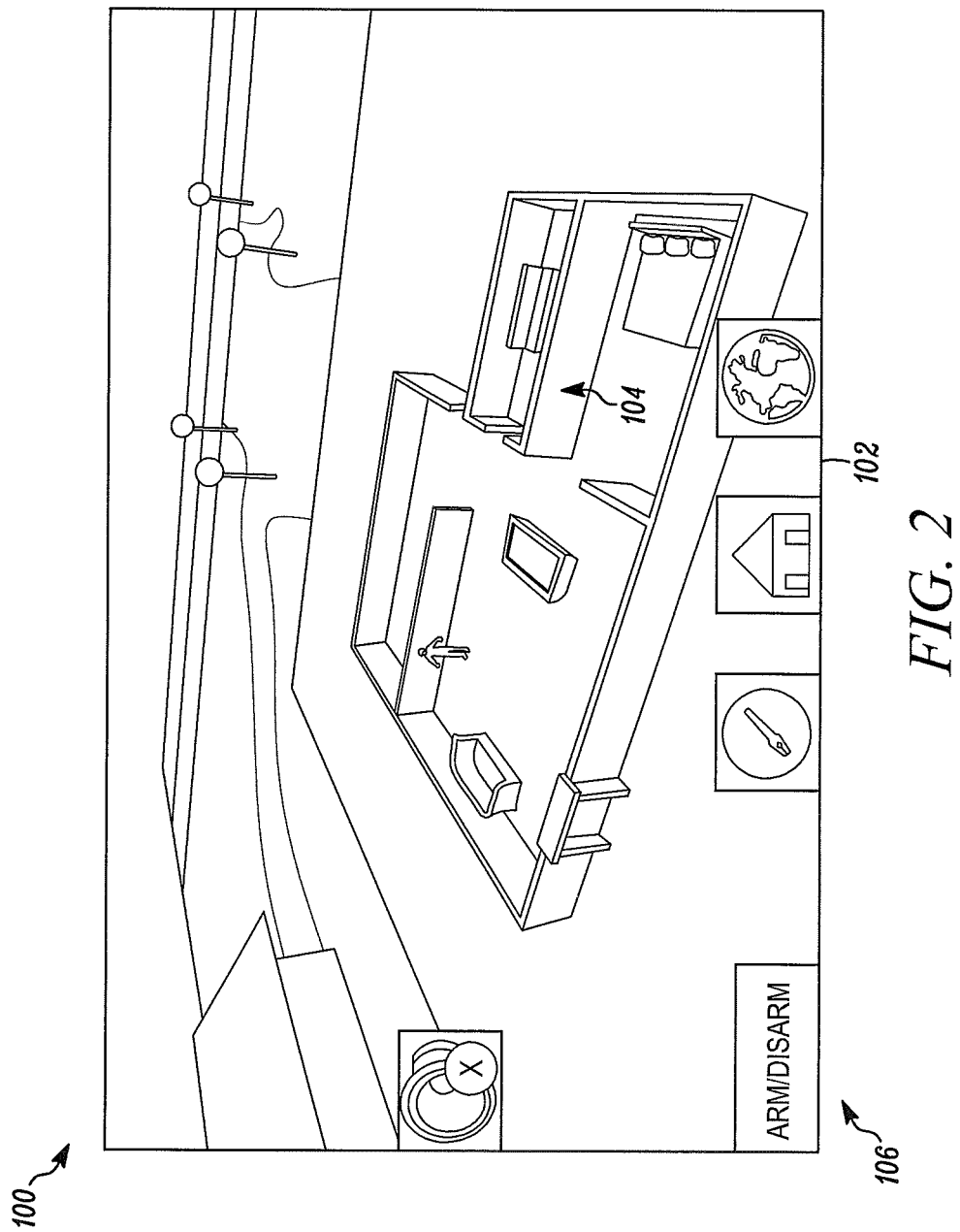
FIG. 2 depicts a three-dimensional map of the secured area of FIG. 1.

Under another illustrated embodiment, the remotely accessible user interface may include a three-dimensional (3D) map of the remotely controlled, secured area as shown in FIG. 2. In this case, the 3D map may be displayed on a user interface of the first security system and that, alternatively, may be presented through a window 102 displayed on the user interface 100 of the second security system. In this case, the 3D map may show the locations of one or more sensors 104. The window may also include one or more functions controls 106 such as arm and/or disarm.

In still another embodiment, the user of the first system may grant control of a home automation system located within the first area to the second user through the second user interface. In this case, the home automation system may be displayed as a separate icon on the first user interface and which may be, alternatively, presented and controlled through the second user interface.

In general, the user interfaces of conventional security systems can access and control their systems only. They cannot access the security and home automation systems of family or other trusted third parties at other locations. These deficiencies of the prior art can be summarized as: 1) home owners currently don't have any sharing mechanism for the monitoring and managing of security and home control systems from anywhere in the world by other trusted parties when the user is away and cannot access his/her home system; 2) home owners currently don't have a secure access mechanism that allows full or partial access to status information retrieved from security and home control systems from anywhere in the world; 3) home owners don't have a mechanism to provide restricted access to specific zones/rooms/areas to other people (e.g., friends, relatives, neighbors, visitors, servants, etc.) for temporary periods of time and with restricted security access code; 4) home owners don't have a sharing mechanism for security and/or home automation system that allows other users access for setup, configuring zones, devices, creating or updating floor maps; and 5) home owners don't have a sharing mechanism that allows full or partial access to home automation systems (e.g., home appliance, lighting, HVAC, door, garage door, water valve, flood sensors, etc.) and health monitoring controls when the primary user is away from home and wants a neighbors or other trusted parties to take care of the house in case of natural calamities, floods, etc.

The systems of FIGS. 1 and 2 operate based upon the social networking/sharing concept. The central monitoring system provides the sharing services as part of the alarm reporting services for the system. This provides worldwide secured sharing and access which connects multiple systems together for security and home automation access control and management.

The central monitoring system also provides full or partial access to security systems for alarm, fire and other critical event monitoring and control when the user is away from home and on travel, etc. for trusted users. Other users can easily access the shared system at least partially through their app, system or conventional alarm software in order to monitor a parent's house, etc.

The central monitoring system provides full or partial access to home automation systems (e.g., home appliance, lighting, HVAC, door, garage door, water valves, flood sensors, etc.) and health monitoring control when the primary user is away from home for use by trusted users. Other users can easily access the shared system through their respective apps or systems to monitor a parent's house, etc. The system provides temporary access by neighbors who can help take care of people, households, appliances in case of medical emergencies, healthcare events, childcare events, shipping delivery, natural calamities, floods, etc. Existing systems available in the market do not provide any comparable functionality. The system of FIG. 1 is very useful during floods or other natural calamities.

The system of FIGS. 1 provides full or partial access through the 3D maps of FIG. 2 to friends, relatives, neighbors, visitors and family members worldwide. In this regard, access is based on the social network sharing concept. The central monitoring station provides the sharing services, chat application and notification as part of an existing monitoring system. The central monitoring station also provides neighboring and external systems information displayed on the 3D map via a chat application used for sharing and notification. Based upon the system of FIG. 1, a user can schedule restricted access to a zone/area for a temporary period of time to friends, relatives, neighbors, visitors, servants via separate access codes using, at least in part, existing applications. Existing applications can keep owners updated on home events. After two-way secured access sharing is established, it is possible to access the security systems of other parties for monitoring, notification and management. Once the user accesses another user's floor map as in FIG. 2, he/she can perform Z-wave operations or modify the floor map depending on the level of access granted. The system of FIG. 1 keeps a log of events and notifies the home owner of such events.

In general, the system of FIG. 1 operates by providing a plurality of security systems, each detecting threats within a different respective secured geographic area and each reporting detected threats to a central monitoring station, a human user of a first of the plurality of security systems sending a notification to an authorized human user of a second of the plurality of security systems through the central monitoring station, the notification authorizing control of the first security system by the user of the second security system, in response to the notification, the central monitoring station forming a control connection between the first and second security systems and the user of the second security system controlling the first security system through a user interface of the second security system.

Alternatively, the system includes a plurality of security systems, each detecting threats within a different respective secured geographic area and each reporting detected threats to a central monitoring station, a user interface of a first of the plurality of security systems that receives an instruction from a human user of the first security system and that causes the first security system to send a notification to an authorized human user of a second of the plurality of security systems through the central monitoring station, the notification authorizing control of the first security system by the user of the second security system, a processor of the central monitoring station that forms a control connection between the first and second security systems and a control interface of the second security system that allows the user of the second security system to control the first security system through a user interface of the second security system.

Alternatively, the system includes a central monitoring station, a plurality of security systems, each having at least one sensor that detects threats within a respective secured geographic area and reports the detected threats to the central monitoring station, a processor of a first of the plurality of security systems that sends an instruction from a human user of the first security system to a corresponding processor of the central monitoring station, the instruction causing the corresponding processor to establish a control connection for control of the first security system by a second of the plurality of security systems and an interface of the second security system that allows a human user of the second security system to control the first security system through a user interface of the second security system.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A method comprising:
   providing a plurality of security systems for detecting threats within secured areas and reporting the threats to a central monitoring station;
   a first user interface of a first security system of the plurality of security systems receiving first user input activating a system control transfer icon displayed on the first user interface;
   responsive to activation of the system control transfer icon, the first user interface presenting a list of a plurality security functions of the first security system to transfer:
   the first user interface receiving second user input selecting one or more of the plurality of security functions of the first security system from the list;
   responsive to the second user input, the first user interface soliciting third user input;
   responsive to soliciting the third user input, the first user interface receiving the third user input selecting a second security system of the plurality of security systems to control the first security system;
   responsive to selection of the second security system, the first security system sending a notification to the second security system through the central monitoring station, the notification authorizing the second security system to directly control the one or more of the plurality of security functions of the first security system;
   responsive to the notification, the central monitoring station forming a control connection between the first security system and the second security system;
   responsive to the central monitoring station forming the control connection, the first security system transferring control of the one or more of the plurality of security functions of the first security system to the second security system; and
   the second security system directly controlling the one or more of the plurality of security functions of the first security system through the control connection and a second user interface of the second security system.

2. The method as in claim 1 wherein the notification includes a chat message that identifies the one or more of the plurality of security functions of the first security system.

3. The method as in claim 1 further comprising the second user interface displaying a representation of the first security system as an added zone of the second security system.

4. The method as in claim 1 further comprising the second user interface displaying status information of the first security system.

5. The method as in claim 1 further comprising the second user interface displaying an interactive representation of the first user interface in a window of the second user interface.

6. The method as in claim 1 wherein the notification authorizes the second security system to directly control only a portion of the first security system.

7. The method as in claim 1 wherein the notification authorizes the second security system to directly control the first security system for a limited time period.

8. The method as in claim 1 wherein the control of the first security system includes the control over a home automation system within one of the secured areas protected by the first security system.

9. The method as in claim 1 wherein one of the secured areas protected by the first security system is displayed as a three-dimensional map on the second user interface.

10. The method as in claim 1 further comprising:
the second security system directly controlling the one or more of the plurality of security functions of the first security system through the control connection and the second user interface of the second security system by receiving fourth user input on the second user interface activating an icon of the one or more of the plurality of security functions of the first security system and transferring an indication of the one or more of the plurality of security functions of the first security system to the first security system through the control connection.

11. An apparatus comprising:
a plurality of security systems detecting threats within secured areas and reporting the threats to a central monitoring station;
a first user interface of a first security system of the plurality of security systems that receives first user input activating a system control transfer icon displayed on the first user interface, that, responsive to activation of the system control transfer icon, presents a list of a plurality security functions of the first security system to transfer, that receives second user input selecting one or more of the plurality of security functions of the first security system from the list, that, responsive to the second user input solicits third user input, that, responsive to soliciting the third user input, receives the third user input selecting a second security system of the plurality of security systems to control the first security system, and that, responsive to selection of the second security system, causes the first security system to send a notification to the second security system through the central monitoring station, wherein the notification authorizes the second security system to directly control the one or more of the plurality of security functions of the first security system;
a processor of the central monitoring station that forms a control connection between the first security system and the second security system; and
a control interface of the second security system that allows the second security system to directly control the one or more of the plurality of security functions of the first security system through a second user interface of the second security system,
wherein the first security system transfers control of the one or more of the plurality of security functions of the first security system to the second security system in response to the central monitoring station forming the control connection.

12. The apparatus as in claim 11 wherein the notification includes a chat message that identifies the one or more of the plurality of security functions of the first security system.

13. The apparatus as in claim 11 wherein the second user interface displays a representation of the first security system as an added zone of the second security system.

14. The apparatus as in claim 11 wherein the second user interface displays status information of the first security system.

15. The apparatus as in claim 11 wherein the second user interface displays an interactive representation of the first user interface on the second user interface.

16. The apparatus as in claim 11 wherein the first user interface receives an instruction including a use limitation, and wherein the notification authorizes the second security system to directly control the first security system subject to the use limitation.

17. The apparatus as in claim 16 wherein the use limitation includes a limited time period for the control of the first security system by the second security system.

18. The apparatus as in claim 16 wherein the use limitation includes a limited set of features of the first security system to be controlled by the second security system.

19. The apparatus as in claim 11 wherein the control of the first security system includes the control over a home automation system within one of the secured areas protected by the first security system.

20. The apparatus as in claim 11 wherein the control interface of the second security system allows the second security system to directly control the one or more of the plurality of security functions of the first security system through the second user interface of the second security system by receiving fourth user input on the second user interface activating an icon of the one or more of the plurality of security functions of the first security system and transferring an indication of the one or more of the plurality of security functions of the first security system to the first security system through the control connection.

* * * * *